United States Patent
Kampeas et al.

(10) Patent No.: US 11,848,748 B2
(45) Date of Patent: Dec. 19, 2023

(54) HIGH-RESOLUTION RADIO USING NEURAL NETWORKS

(71) Applicant: GM GLOBAL TECHNOLOGY OPERATIONS LLC, Detroit, MI (US)

(72) Inventors: Joseph Kampeas, Ramat Gan (IL); Igal Kotzer, Tel-Aviv (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 478 days.

(21) Appl. No.: 17/120,890

(22) Filed: Dec. 14, 2020

(65) Prior Publication Data

US 2022/0190943 A1 Jun. 16, 2022

(51) Int. Cl.
*H04H 40/18* (2008.01)
*G06N 3/08* (2023.01)
*G06N 3/044* (2023.01)

(52) U.S. Cl.
CPC ............ *H04H 40/18* (2013.01); *G06N 3/044* (2023.01); *G06N 3/08* (2013.01)

(58) Field of Classification Search
CPC .......... G06N 3/08; G06N 3/045; G06N 3/044; G06N 3/04; G06N 3/047; G06N 3/048; G06N 3/082; G06N 3/084; G06N 5/02; G06N 7/01; H04H 60/07; H04H 60/58

USPC .......................................................... 455/323
See application file for complete search history.

(56) References Cited

U.S. PATENT DOCUMENTS

| | | | |
|---|---|---|---|
| 2014/0257804 A1* | 9/2014 | Li ........................... | G10L 15/16 |
| | | | 704/232 |
| 2022/0124444 A1* | 4/2022 | Andersen ............. | H04R 25/507 |

FOREIGN PATENT DOCUMENTS

GB 2560174 A * 9/2018 ............. G10L 15/02

OTHER PUBLICATIONS

Fu et al., "Complex spectrogram enhancement by convolutional neural network with multi-metrics learning" 2017 IEEE 27th International Workshop on Machine Learning for Signal Processing (MLSP). IEEE (Sep. 2017) pp. 1-6.
Kuleshov et al., "Audio super-resolution using neural nets" ICLR (Workshop Track) (Apr. 2017) 8 pages.

* cited by examiner

*Primary Examiner* — Ajibola A Akinyemi
(74) *Attorney, Agent, or Firm* — CANTOR COLBURN LLP

(57) ABSTRACT

An apparatus and method for enhancing broadcast radio includes a DNN trained on data sets of audio created from a synthesized broadcasting process and original source audio. Broadcast radio signals are received at a radio module and processed through the DNN to produce enhanced audio.

20 Claims, 3 Drawing Sheets

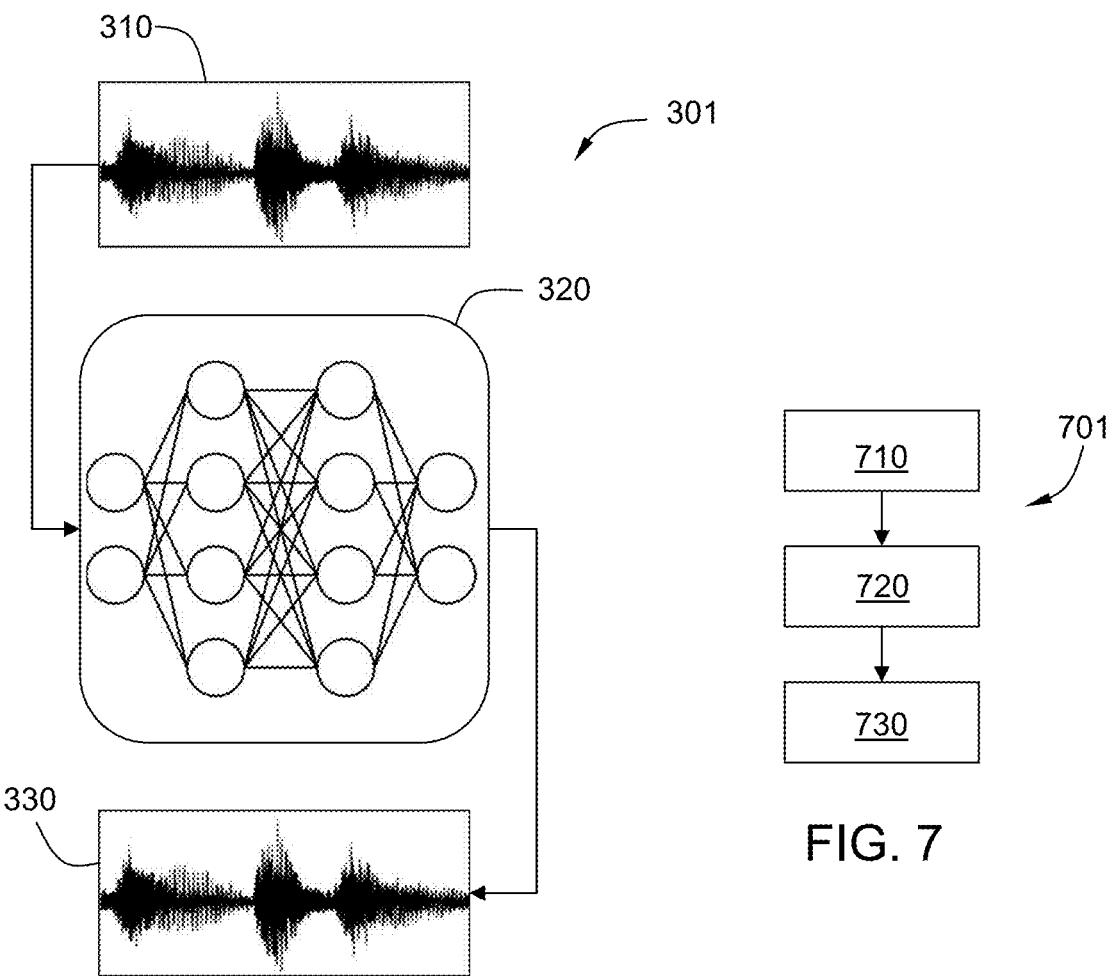
FIG. 3
FIG. 7
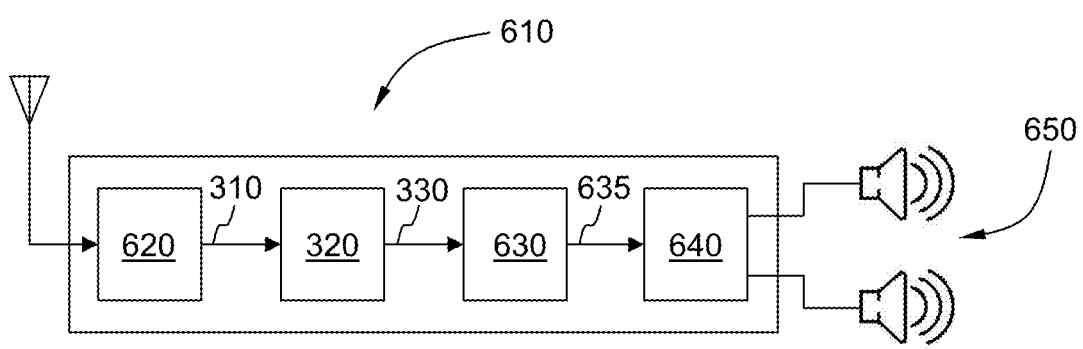
FIG. 6

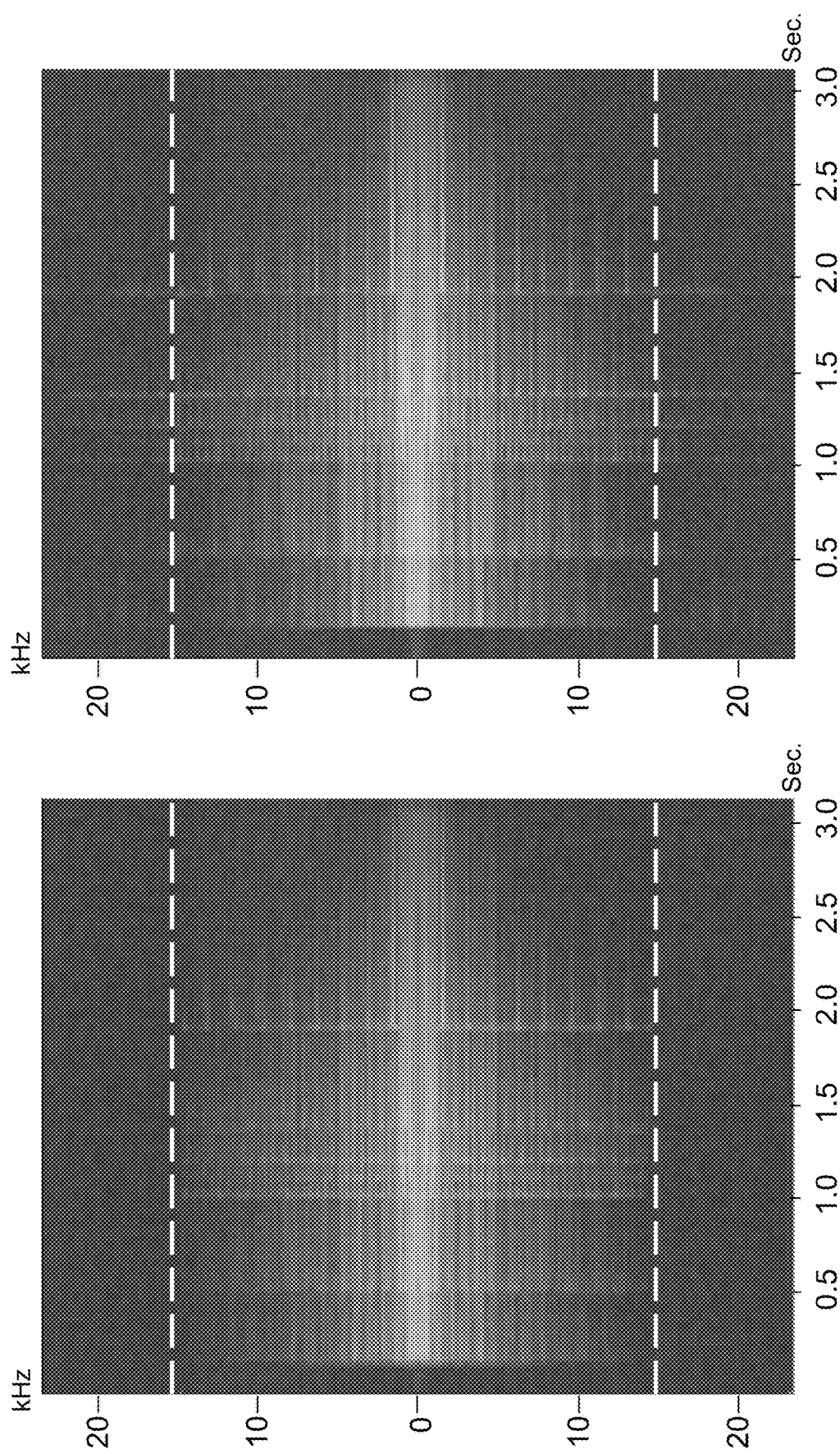

HIGH-RESOLUTION RADIO USING NEURAL NETWORKS

INTRODUCTION

This disclosure is related to terrestrial radio broadcast signals.

Broadcasting standards for amplitude modulation (AM) and frequency modulation (FM) regulate maximum transmitted audio bandwidth to, for example, 10.2 kHz and 15 kHz, respectively. Bandwidth limitations directly result in audio spectrum limitations carried in broadcast signals. Therefore, maximum audio frequency range for such AM broadcasts is about 10 kHz whereas maximum audio frequency range for such FM broadcasts is about 15 kHz. Human hearing range is generally from about 20 Hz to about 20 kHz.

SUMMARY

In one exemplary embodiment, an apparatus may include a radio module having a receiver module and a deep neural network (DNN) module. The receiver module may include a digital audio signal output having no audio content above a predetermined broadcast cutoff frequency. The DNN module may include an input receiving the digital audio signal and an output including reconstructed audio having audio content above the predetermined broadcast cutoff frequency.

In addition to one or more of the features described herein, the DNN module may include a DNN module trained on a first data set of synthesized audio created through a synthesized broadcasting processor and a second data set of source material audio.

In addition to one or more of the features described herein, the synthesized broadcasting processor may include an impairment module adding signal impairments to an FM_RF signal.

In addition to one or more of the features described herein, the synthesized broadcasting processor may include a transmit module having a predetermined broadcast cutoff frequency, a signal multiplexing encoder module and a signal modulation module, and a receive module having a signal demodulation module and a signal multiplexing decoder module.

In addition to one or more of the features described herein, the synthesized audio may include a first resolution and the source material audio may include a second resolution, wherein the second resolution is greater than the first resolution.

In addition to one or more of the features described herein, the DNN module may include at least one downsampling layer.

In addition to one or more of the features described herein, the DNN module may include at least one upsampling layer.

In addition to one or more of the features described herein, the DNN module may include a recurrent neural network having looping constraints applied on at least one layer.

In addition to one or more of the features described herein, the receiver module may include an FM receiver module.

In addition to one or more of the features described herein, the receiver module may include an AM receiver module.

In another exemplary embodiment, a method may include training a DNN on a first data set of synthesized audio created through a synthesized broadcasting processor and on a second data set including source material audio. The method may include receiving, at a receiver module, a broadcast signal and providing therefrom a digital audio signal output having no audio content above a broadcast cutoff frequency. The method may include processing, at the DNN module, the digital signal output from the receiver module to reconstruct audio including audio content above the broadcast cutoff frequency.

In addition to one or more of the features described herein, the method may further include creating, through the synthesized broadcasting processor, the first data set of synthesized audio, including providing the source material audio to the synthesized broadcast processor and propagating signals through a transmit module having the broadcast cutoff frequency, a signal multiplexing encoder module and a signal modulation module, and a receive module having a signal demodulation module and a signal multiplexing decoder module.

In addition to one or more of the features described herein, the first data set of synthesized audio may include a first resolution and the second data set of source material audio may include a second resolution, wherein the second resolution is greater than the first resolution.

In addition to one or more of the features described herein, the receiver module may include an FM receiver module and the broadcast signal may include an FM broadcast signal.

In addition to one or more of the features described herein, the receiver module may include an AM receiver module and the broadcast signal may include an AM broadcast signal.

In addition to one or more of the features described herein, wherein creating, through the synthesized broadcasting processor, the first data set of synthesized audio further includes, propagating the signals through an impairment module adding signal impairments thereto.

In yet another exemplary embodiment, an apparatus may include an FM radio module having an FM receiver module. The FM receiver module may include an audio signal output having no audio content above a predetermined broadcast cutoff frequency. The apparatus may include a DNN module trained on a first data set of synthesized audio created through a synthesized FM broadcasting processor and on a second data set of source material audio. The DNN module may include an input receiving the audio signal output and an output including reconstructed audio content above the predetermined broadcast cutoff frequency.

In addition to one or more of the features described herein, the synthesized FM broadcasting processor may include a transmit module, an impairment module, and a receive module.

In addition to one or more of the features described herein, the transmit module may include a predetermined broadcast cutoff frequency, a signal multiplexing encoder module and a signal modulation module.

In addition to one or more of the features described herein, the receive module may include a signal demodulation module and a signal multiplexing decoder module.

The above features and advantages, and other features and advantages of the disclosure are readily apparent from the following detailed description when taken in connection with the accompanying drawings.

BRIEF DESCRIPTION OF THE DRAWINGS

Other features, advantages, and details appear, by way of example only, in the following detailed description, the detailed description referring to the drawings in which:

FIG. 3 illustrates application of a trained DNN, in accordance with the present disclosure;

FIG. 4 illustrates a spectral representation of audio extracted from an 8-bit resolution audio signal, in accordance with the present disclosure;

FIG. 5 illustrates a spectral representation of a reconstructed audio output from a trained DNN, in accordance with the present disclosure;

FIG. 6 illustrates a block diagram implementation hardware scheme for reconstructing audio from an FM signal using a trained DNN, in accordance with the present disclosure; and FIG. 7 illustrates a block diagram implementation hardware scheme for reconstructing audio from an FM signal using a trained DNN, in accordance with the present disclosure.

DETAILED DESCRIPTION

Figure 1:
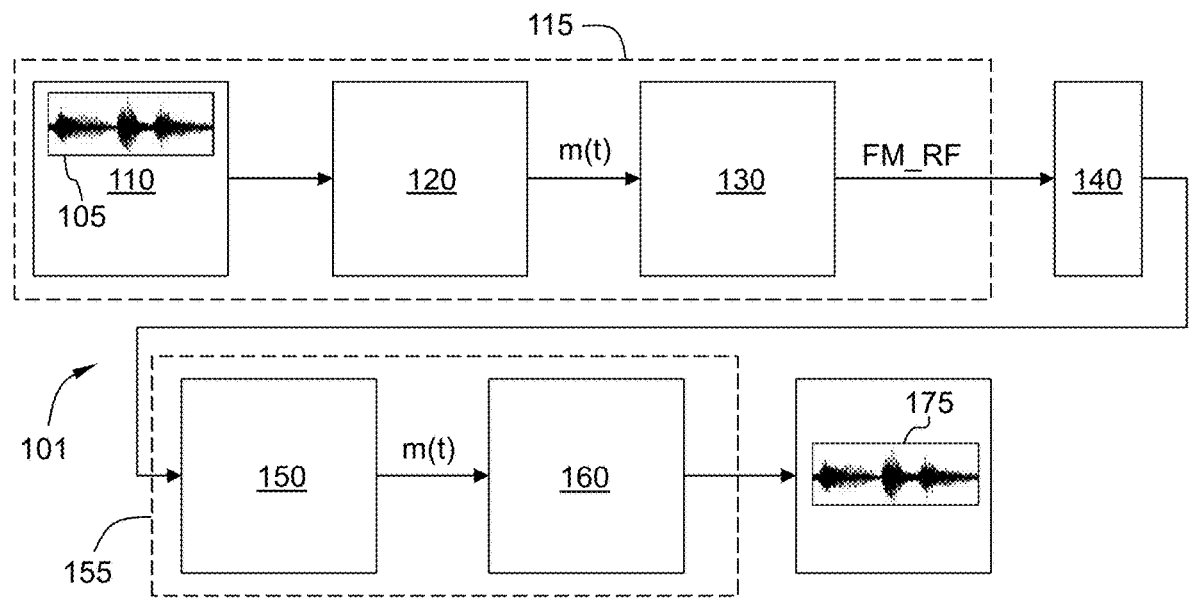
FIG. 1 illustrates a process for creation of a deep neural network (DNN) training data set of synthesized FM audio, in accordance with the present disclosure.

The following description is merely exemplary in nature and is not intended to limit the present disclosure, its application or uses. Throughout the drawings, corresponding reference numerals indicate like or corresponding parts and features. As used herein, control module, module, control, controller, control unit, electronic control unit, processor and similar terms mean any one or various combinations of one or more of Application Specific Integrated Circuits (ASIC), electronic circuits, central processing units (preferably microprocessors) and associated memory and storage (read only memory (ROM), random access memory (RAM), electrically programmable read only memory (EPROM), hard drive, etc.), field-programmable gate arrays (FPGA), graphic processing units (GPU), or microcontrollers executing one or more software or firmware programs or routines, combinational logic circuits, input/output circuitry and devices (I/O) and appropriate signal conditioning and buffer circuitry, high speed clock, analog to digital (A/D) and digital to analog (D/A) circuitry and other components to provide the described functionality. A control module may include a variety of communication interfaces including point-to-point or discrete lines and wired or wireless interfaces to networks including wide and local area networks, on vehicle controller area networks and in-plant and service-related networks. Functions of the control module as set forth in this disclosure may be performed in a distributed control architecture among several networked control modules. Software, firmware, programs, instructions, routines, code, algorithms and similar terms mean any controller executable instruction sets including calibrations, data structures, and look-up tables. A control module has a set of control routines executed to provide described functions. Routines are executed, such as by a central processing unit, and are operable to monitor inputs from sensing devices and other networked control modules and execute control and diagnostic routines to control operation of actuators. Routines may be executed at regular intervals during ongoing engine and vehicle operation. Alternatively, routines may be executed in response to occurrence of an event, software calls, or on demand via user interface inputs or requests.

In accordance with one aspect of the disclosure, and in an exemplary embodiment related to FM radio, audio content above about 15 kHz is absent from an FM signal. Therefore, even where an original audio source or program material may include substantial audio content above 15 kHz, such content is never carried from the source to the end user. In accordance with one aspect of the present disclosure, the audio content of a received FM signal may be processed through a trained DNN which enhances the signal and reconstructs the original source audio content. In accordance with another aspect of the present disclosure, a DNN requires training such that the DNN understands the impairment criteria or characteristics. Thus, a first training input to a DNN may be original source material audio, and a second input may be a filtered input which is the original source material audio passed through an FM modulator and demodulator and which may further represent various impairments of the signals in a terrestrial FM broadcast system. The DNN cost function that the DNN should work on is such that it minimizes the difference between the output and the input. The output should ideally look just like the input. Thus, the role of the DNN is to add the frequencies that were filtered out before the FM modulator. An additional criteria for the DNN cost function may include a psycho-acoustic model, for example known models used in MP3 audio file compression, so that the actual sampled signal is not identical but sounds identical to the human ear.

FIG. 1, in accordance with one embodiment, illustrates a process and processor 101 including various modules for creation of a DNN training data set of synthesized FM audio 175. The training data set may be created from high quality digital audio signals 105 of source material audio (e.g. music, voice) which is processed through a synthesized FM broadcasting process and processor, including a transmit module 115 and receive module 155, into a training data set of synthesized FM audio 175. The transmit module 115 of process and processor 101 begins with the source material audio of high quality digital audio signals 105 which may be, for example, a 24-bit resolution stereo audio file sampled between about 44.1 kHz and below about 192 kHz having a frequency range extending above a broadcast cutoff frequency. High quality digital audio signals 105 generally refers to at least one of bit resolution, sampling rate, frequency range and dynamic range of the source material audio exceeding that of a resultant signal subsequent to common transmission and receive processes of FM broadcasting. In one embodiment, the frequency range may extend up to about 24 kHz. Certain audio signal preprocessing may be performed at audio signal preprocessing module 110 which may include common preprocessing steps of an FM broadcast base station. For example, audio signal preprocessing module 110 may include subjecting the source material audio to pre-emphasis, commonly employed in schemes to offset random noise which is known to be most prevalent in higher audio frequencies. Low pass filtering with a broadcast cutoff frequency of about 15 kHz may also be performed upon the source material audio at audio signal preprocessing module 110. Moreover, decimation of the source material audio may be performed at the audio signal preprocessing module 110. A multiplex (MPX) FM encoder module 120 receives preprocessed left (L) and right (R) stereo channels of the preprocessed source material audio and may provide a stereo multiplex signal (m(t)) including L+R, L−R and a pilot tone information. The stereo multiplex signal m(t) is frequency modulated at FM modulator module 130 to provide an FM radio frequency (RF) signal (FM_RF) representative of the RF signal that would be power amplified and provided to an FM transmission antenna for over air broadcast in a terrestrial broadcast system. In the present synthesized FM broadcasting process and processor, the FM_RF signal may be further processed at over-air impairment module 140 to include various FM_RF signal impairments representative of physical impairments that may attach to a broadcasted signal. For example, various signal impairments may be added to the FM_RF signal including impulses, carrier amplitude fluctuations, phase and multipath noise sources to mimic various physical world impairments to an over air propagated broadcast signal. One skilled in the art understands that the transmit module 115 inflicts various impairments upon the signal, thus reducing the quality of the propagated signal. The receive module 155 begins with the impaired FM_RF signal being processed by an FM demodulator module 150, for example a phase locked loop FM demodulator. Other demodulation schemes may include non-limiting examples of an FM slope detector, FM ratio detector, and quadrature FM demodulator. It may be preferred that the type of demodulator applied to the FM_RF signal match the type of demodulator employed in the end use FM radio receiver to employ the trained DNN of the present disclosure. The output from the FM demodulator module 150 may be a multiplex signal m(t) which may then be processed by a MPX FM decoder module 160 to extract intermediate L+R, L−R signals and ultimately the L and R channel stereo audio signals. The L and R stereo audio signals may conform to standard n-bit resolution audio signals, for example from 8-bit to 64-bit resolutions though any bit resolution may be employed. The L and R stereo audio signals will, of course, be limited to the frequency range of below about 15 kHz in accordance with the high frequency filtering constraints placed upon the source material audio at audio signal preprocessing module 110. One skilled in the art understands that the receive module 155 inflicts various impairments upon the signal, thus reducing the quality of the propagated signal. The n-bit resolution audio signals may also contain noise corresponding to any signal impairments added to the FM_RF signals at over air impairment module 140. The n-bit resolution audio signals, including all transmit processing, receive processing and over-air impairments, may be referred to as the synthesized FM audio 175 and provides the DNN training data set.

Figure 2:
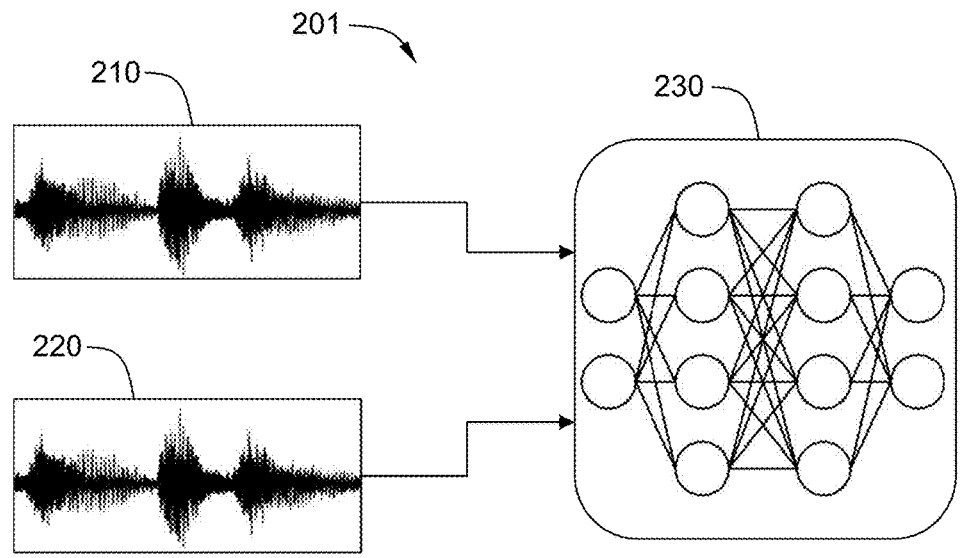
FIG. 2 illustrates a DNN training process, in accordance with the present disclosure.

FIG. 2 illustrates a DNN training process and processor 201. Having created a DNN training data set of synthesized FM audio 175, a DNN 230 may next be trained using the DNN training dataset 210 as one set of data inputs with the corresponding source material audio 220 as another set of data inputs. The objective of the training is to map the DNN training dataset 210 of synthesized FM audio 175 to the source material audio 220. The training phase may generally include optimizations of weights and biases to minimize the differences between the two input data sets. In one embodiment, the DNN may include at least one convolutional layer. One skilled in the art will recognize that the DNN training data set 210 and the 24-bit resolution audio signals making up the source material audio 220 may be dimensionally different in resolution and/or sampling. In one embodiment, a downsampling layer may beneficially reduce dimensionality of input data, for example as applied to the source material audio which may be sampled at a higher rate than the DNN training dataset. In one embodiment, an upsampling layer may beneficially increase dimensionality of input data, for example as applied to the DNN training dataset which may be sampled at a lower rate that the source material audio. In one embodiment, the DNN training process 201 may include application of dropout regularization methods to one or more layers for example to avoid overfitting issues. In one embodiment, the DNN 230 may include a recurrent neural network having looping constraints applied on at least one layer. Once the training process is completed, the trained neural network is capable of reconstructing the audio content for different program material (e.g. music, voice, etc.) and conditions (e.g. signal impairments).

FIG. 3 illustrates application of the DNN trained in accordance with the disclosure in reference to FIG. 1 and FIG. 2. The trained DNN 320 uses as its input a terrestrial broadcast FM signal that is captured by a radio receiver and which is available in the digital domain, for example as an 8-bit resolution audio signal 310. The trained DNN 320 will output an enhanced version of the program material 330 including a reconstruction of content above the 15 kHz broadcast cutoff frequency of the preprocessed source material audio and elimination of the various signal impairment induced noises and distortions. A spectral representation of the audio extracted from the 8-bit resolution audio signal 310 is illustrated in FIG. 4. The vertical axis represents L and R stereo information measured in kHz with each channel being vertically above or below the 0 kHz mark. The horizontal axis marks time in seconds. The white dashed lines substantially designate the 15 kHz broadcast cutoff frequency for each channel above which no audio content is represented. Such spectral representation is consistent with conventional FM broadcast audio and is consistent with the 8-bit resolution audio signal 310 input to the trained DNN 320. A spectral representation of the reconstructed audio output from the trained DNN 320 is illustrated in FIG. 5. The vertical axis represents L and R stereo information measured in kHz with each channel being vertically above or below the 0 kHz mark. The horizontal axis marks time in seconds. The white dashed lines substantially designate the 15 kHz broadcast cutoff frequency of the audio extracted from the 8-bit resolution audio signal 310 as previously described. The spectral representation of the reconstructed audio of FIG. 5 in contrast includes significant audio content at higher frequencies above 15 kHz.

FIG. 6 represents a block diagram implementation hardware scheme for reconstructing audio from an FM signal using a trained DNN as set forth above. A radio module 610, for example a radio head or infotainment device in an automobile may receive FM broadcast signals in a receiver module 620. The receiver module 620 may be operative in analog or digital domains. The receiver module 620 provides either directly or through intermediate A/D conversions audio signal 310. Trained DNN hardware module 320, for example including high performance digital processors such as a GPU, ASIC, FPGA, DSP and custom SOC, may receive the audio signal 310 and output an enhanced version of the program material 330. The program material 330 may then pass to a D/A converter 630 to generate analog signal channels 635. Amplifier section 640 receives the analog signal channels 635 and drives speakers 650.

FIG. 7 illustrates a method 701 including training and application steps for DNN based high-resolution audio reconstruction from FM broadcast radio. At stage 710, a DNN training data set of synthesized FM audio is created. This may include providing source material audio in the form of high quality digital audio signals and propagating the signals through a synthesized FM broadcasting process. A synthesized FM broadcasting process may include both transmit and receive phases. The transmit phase may include preprocessing of the digital audio signals including at least low pass filtering using a predetermined broadcast cutoff frequency. MPX FM encoding and FM modulation is performed upon the propagated signal as part of the transmit phase. Finally, signal impairments may be attached to the propagated signal including, for example, impulses, carrier amplitude fluctuations, phase and multipath noise sources to mimic various physical world impairments to an over air propagated broadcast signal. The receive phase may include the propagated signal being processed by an FM demodulator and then propagated to a MPX FM decoder whereafter the propagated signals represent synthesized FM audio signals used in a DNN training data set. At stage 720, a DNN is trained utilizing the DNN training data set created through the synthesized FM broadcasting process and the source material audio in the form of high quality digital audio signals. At stage 730, the trained DNN is applied, such as in a terrestrial radio receiver, to reconstruct high-resolution audio from terrestrial FM broadcasts. The trained DNN uses as its input a terrestrial broadcast FM signal that is captured by a radio receiver and which is available in the digital domain. The trained DNN will output an enhanced version of the program material including a reconstruction of content above the predetermined broadcast cutoff frequency limits of the FM broadcast and elimination of the various signal impairment induced noises and distortions.

Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements.

It should be understood that one or more steps within a method or process may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. An apparatus, comprising:
   a radio module comprising a receiver module receiving a radio frequency (RF) terrestrial broadcast signal containing program material subjected to a predetermined broadcast cutoff frequency and a DNN module;
   the receiver module demodulating the RF terrestrial broadcast signal and outputting an audio signal output having no audio content above the predetermined broadcast cutoff frequency; and
   the DNN module receiving the audio signal from the receiver module, reconstructing audio content above the predetermined broadcast cutoff frequency, and outputting an enhanced version of the program material including the reconstructed audio content above the predetermined broadcast cutoff frequency.

2. The apparatus of claim 1, wherein the DNN module comprises a DNN module trained on a first data set of synthesized audio created by subjecting a source material audio to a synthesized broadcasting processor including a transmit module and a receive module and on a second data set of the source material audio.

3. The apparatus of claim 2, wherein the program material is further subjected to RF broadcast signal impairments and the synthesized broadcasting processor further includes an RF broadcast signal impairment module.

4. The apparatus of claim 2, wherein the transmit module comprises the predetermined broadcast cutoff frequency, a signal multiplexing encoder module and a signal modulation module, and the receive module comprises a signal demodulation module and a signal multiplexing decoder module.

5. The apparatus of claim 2, wherein the synthesized audio comprises a first resolution and the source material audio comprises a second resolution, wherein the second resolution is greater than the first resolution.

6. The apparatus of claim 5, wherein the DNN module comprises at least one downsampling layer.

7. The apparatus of claim 5, wherein the DNN module comprises at least one upsampling layer.

8. The apparatus of claim 2, wherein the DNN module comprises a recurrent neural network comprising looping constraints applied on at least one layer.

9. The apparatus of claim 2, wherein the receiver module comprises an AM receiver module.

10. The apparatus of claim 1, wherein the receiver module comprises an FM receiver module.

11. A method, comprising:
    training a DNN module on a first data set of synthesized audio created through by subjecting a source material audio to a synthesized broadcasting processor including a transmit module and a receive module and on a second data set comprising source material audio;
    receiving, at a receiver module, a radio frequency (RF) terrestrial broadcast signal containing program material subjected to a predetermined broadcast cutoff frequency;
    demodulating, at the receiver module, the RF terrestrial broadcast signal and outputting therefrom an audio signal having no audio content above the predetermined broadcast cutoff frequency; and
    processing, at the DNN module, the audio signal from the receiver module to reconstruct audio content above the predetermined broadcast cutoff frequency and output an enhanced version of the program material including the reconstructed audio content above the predetermined broadcast cutoff frequency.

12. The method of claim 11,
    wherein subjecting the source material audio to the synthesized broadcasting processor, comprises:
    propagating the source material audio through the transmit module comprising the broadcast cutoff frequency, a signal multiplexing encoder module and a signal modulation module, and the receive module comprising a signal demodulation module and a signal multiplexing decoder module.

13. The method of claim 12, wherein the first data set of synthesized audio comprises a first resolution and the second data set of source material audio comprises a second resolution, wherein the second resolution is greater than the first resolution.

14. The method of claim 12, wherein the program material is further subjected to RF broadcast signal impairments and subjecting the source material audio to the synthesized broadcasting processor, further comprises, propagating the source material audio through an RF broadcast signal impairment module.

15. The method of claim 11, wherein the receiver module comprises an FM receiver module and the RF terrestrial broadcast signal comprises an FM broadcast signal.

16. The method of claim 11, wherein the receiver module comprises an AM receiver module and the RF terrestrial broadcast signal comprises an AM broadcast signal.

17. An apparatus, comprising:
- an FM radio module comprising an FM receiver module receiving an FM terrestrial broadcast signal containing program material subjected to a predetermined broadcast cutoff frequency;
- the FM receiver module demodulating the FM terrestrial broadcast signal and outputting an audio signal having no audio content above the predetermined broadcast cutoff frequency;
- a DNN module trained on a first data set of synthesized audio created by subjecting a source material audio to a synthesized FM broadcasting processor including a transmit module and a receive module and on a second data set of the source material audio; and
- the DNN module receiving the audio signal from the receiver module, reconstructing audio content above the predetermined broadcast cutoff frequency, and outputting an enhanced version of the program material including the reconstructed audio content above the predetermined broadcast cutoff frequency.

18. The apparatus of claim 17, wherein the program material is further subjected to FM broadcast signal impairments and the synthesized FM broadcasting processor further includes an FM broadcast signal impairment module.

19. The apparatus of claim 18, wherein the transmit module comprises, the predetermined broadcast cutoff frequency, a signal multiplexing encoder module and a signal modulation module.

20. The apparatus of claim 18, wherein the receive module comprises a signal demodulation module and a signal multiplexing decoder module.

\* \* \* \* \*